United States Patent Office 3,191,665
Patented June 29, 1965

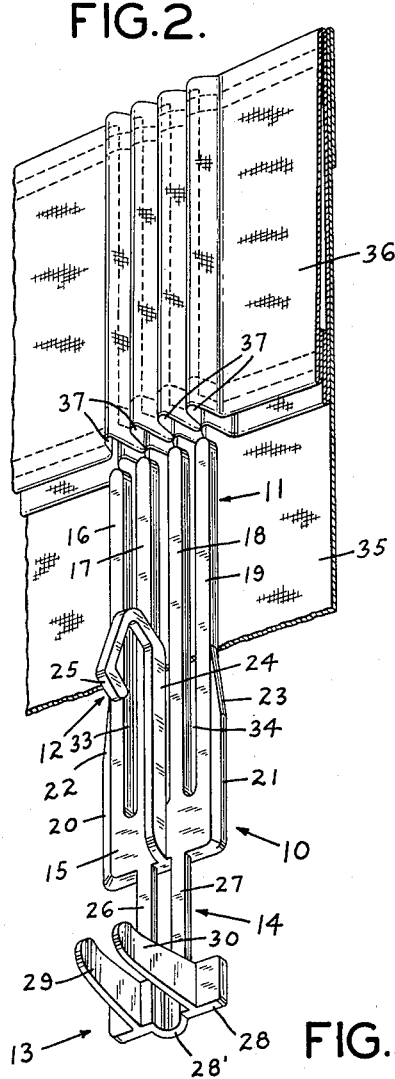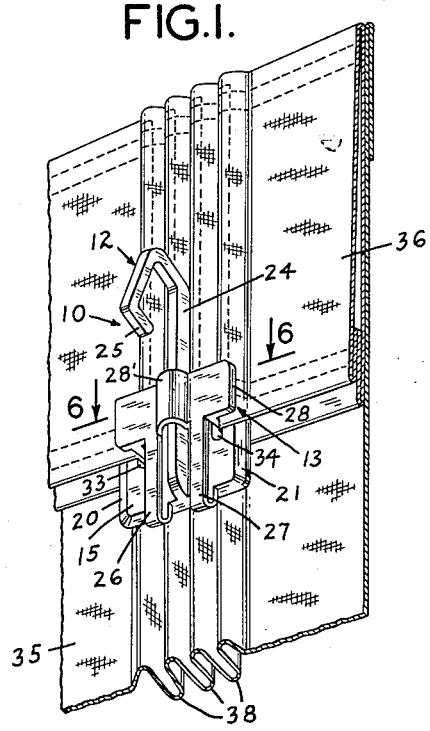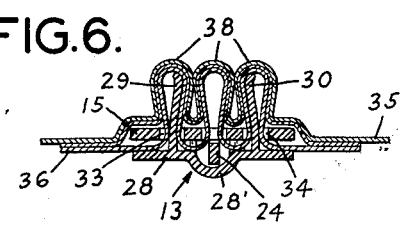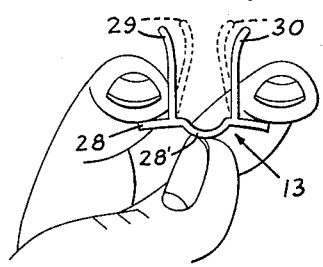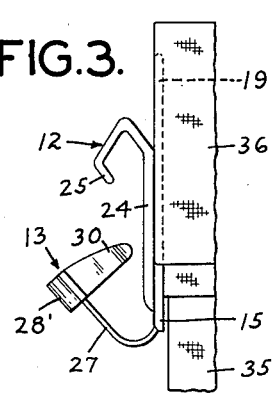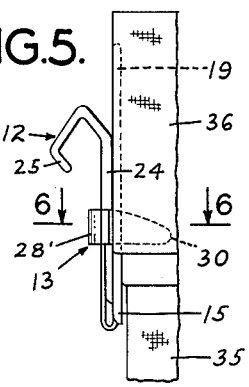

3,191,665
PLEATER HOOK
Charles H. Rosenbaum, Baltimore, and Henry Znamirowski, Ellicott City, Md., assignors to Eastern Products Corporation, Baltimore, Md., a corporation of Maryland
Filed Dec. 18, 1962, Ser. No. 245,616
2 Claims. (Cl. 160—348)

The present invention relates to pleater hooks and more particularly to pleater hooks of the type intended to be used with draperies to produce pinch pleats.

The principal object of the invention has been to provide a novel pleater hook and pinch clip.

Another object of the invention has been to provide such a pleater hook and pinch clip which is inexpensive to manufacture, easy to install and which is positively retained in position.

Another object of the invention has been to provide a pleater hook and pinch clip construction which avoids the danger of rust marks and the danger of tearing draperies, both of which have been common problems with metal pleater hooks heretofore commonly used.

A feature of the invention has been the provision of a pinch clip construction in which the pinch clip is easily installed and which automatically locks in position.

Other and further objects, features and advantages of the invention will appear more fully from the following description of the invention taken in connection with the appended drawings, in which:

FIG. 1 is a perspective view of a section of drapery with a pleater hook embodying the invention installed therein;

FIG. 2 is a perspective view similar to FIG. 1 showing the drapery folded into pleats but with the pleater hook in position to be installed;

FIG. 3 is a side view showing the pleater hook installed and with the pinch clip in position to be installed;

FIG. 4 is a plan view of the pinch clip portion of the pleater hook illustrating the manual operation required to install the pinch clip;

FIG. 5 is a view similar to FIG. 3 showing the pinch clip fully installed; and

FIG. 6 is a sectional view taken along the line 6—6 of FIG. 5 and the line 6—6 of FIG. 1.

Referring now to the drawings, the pleater hook 10 is molded as a unitary element from any suitable resilient plastic, e.g., Delrin or nylon, and comprises a finger portion 11, a hook portion 12, a pinch clip 13 and a leg portion 14. The thickness of the pleater hook material, except for the leg portion 14, should be selected to maintain its shape in use and to resist permanent deformation.

The finger portion 11 comprises a base 15 from which project four spaced parallel fingers 16, 17, 18 and 19 each of which has a rounded upper end. As best shown in FIGS. 3 and 5, the upper ends of the fingers are slightly tapered in thickness to facilitate finger entry into the pleater tape pockets. Near their bases the fingers 16 and 19 are provided with outwardly extending flanges 20 and 21, respectively, the upper ends of which are tapered, as shown at 22 and 23. The flanges 20 and 21 are preferably slightly thinner than the bodies of the fingers. The flanges 20 and 21 are stiffening members which serve to resist spreading of the outer pleater hook fingers.

The hook portion 12 comprises an arm 24 which projects from base 15 and extends upwardly between and behind fingers 17 and 18, terminating in a hook 25. The hook 25 is adapted to be engaged in the hole of a slide carried on a traverse rod or other drapery support.

The leg portion 14 comprises a pair of parallel legs 26 and 27 which project downwardly from the bottom of base 15 and serve to support pinch clip 13. As best shown in FIGS. 3 and 5, the legs 26 and 27 are relatively thin compared to the remainder of the hook 10 and hence are easily bent.

The pinch clip 13 comprises a base or body portion 28 and forwardly extending legs 29 and 30. The legs 29 and 30, in their rest positions as shown in FIG. 2 and as shown in dotted lines in FIG. 4 extend toward each other, i.e., they toe-in. The legs 29 and 30 are tapered toward rounded ends as best shown in FIGS. 2 and 3. The bases of legs 29 and 30 are located directly beneath spaces 33 and 34, respectively, between fingers 16 and 17 and between fingers 18 and 19, respectively. The base 28 is provided with a U-shaped central portion 28′ which is adapted to overlie arm 24, as shown in FIG. 1.

The drapery 35 to be suspended by pleater hook 10 is provided adjacent the upper end thereof with a pleater tape 36 which is provided with the usual pleater pockets 37. The pleater tape 36 will usually be stitched to the drapery, as shown. The pockets 37 are parallel and equally spaced and the upper ends thereof are usually closed, as by a line of stitching. The pleater tape illustrated is of the sewn type in which the pockets are formed by stitching, but the tape could be of any other suitable type, e.g., a woven pleater tape. When the drapery 35 is folded so that four pleater pockets 37 lie adjacent each other, the desired pleats 38 will be formed in the drapery.

The pleater hook fingers 16, 17, 18 and 19 are inserted in adjacent pockets in the pleater tape and are pushed upwardly until fully seated in the pockets. The pinch clip 13 is then manually distorted from the toed-in rest position thereof in which the legs 29 and 30 occupy the dotted line positions shown in FIG. 4 to the insertion position in which the legs 29 and 30 are spread and occupy the full line positions shown in FIG. 4. This distortion may be accomplished by placing the thumb against the bottom center of body 28 and the index and middle fingers against the top sides of body 28, as shown in FIG. 4, and applying opposite pressures to the ends and center of body 28 to force the ends of legs 29 and 30 to move outwardly so that legs 29 and 30 become substantially parallel. The pinch clip 13 is sufficiently resilient so that when this distorting force is released the legs will return to their rest positions.

With the pinch clip spread (FIG. 4), the legs 29 and 30 are inserted into spaces 33 and 34, respectively, going from the position shown in FIG. 3 to the position shown in FIG. 5. As is best shown in FIG. 6, the legs 29 and 30 enter between the outermost two folds of cloth forming pleats 38. The pinch clip base is released and the legs 29 and 30 automatically toe-in toward their rest positions (FIG. 6), producing the desired pinch effect at the base of the pleat and locking the pinch clip in place. The pinch clip may be manually retracted by pulling on body 28. When the pinch clip is retracted, the pleater hook fingers may be pulled downwardly out of the pleater tape.

While the invention has been described in connection with a specific embodiment thereof and in a specific use, various modifications thereof will occur to those skilled in the art without departing from the spirit and scope of the invention as set forth in the appended claims.

What is claimed is:

1. A plastic pleater hook, comprising a base, four parallel, resilient, elongated pleater fingers integral with said base and projecting upwardly therefrom, a supporting arm projecting from said base and extending upwardly behind said fingers, said supporting arm having a drape-hanging, hook-like formation at the free end thereof, a pinch clip having a deformable body and a pair of pleat retaining and locking arms integral with and projecting from said body, said pleat retaining arms being toed-in toward each other when said body is undeformed and being movable into substantially parallel position upon predetermined manual deformation of said body, and suspending means integral with said base and said body for holding said pinch clip beneath said base and with said pleat retaining arms in substantial alignment with the spaces between respective outer pairs of said pleating fingers, said suspending means being bendable to permit said pinch clip to be moved from a position beneath said base to a position behind said base and, upon said predetermined deformation of said body, to a position in which said pleat retaining arms project into said respective spaces, a portion of said pleat retaining arms projecting in front of said pleating fingers in said last mentioned position of said pinch clip, said pleat retaining arms, upon release of said body, toeing-in to lock said pinch clip in said last mentioned position thereof, said body having finger engageable portions of the outsides of said pleat retaining arms and a thumb engageable portion between said pleat retaining arms to permit deformation of said clip by manually engaging said body with two fingers on one face and the corresponding thumb on the other face.

2. A plastic pleater hook, comprising a base, four parallel, resilient, elongated pleater fingers integral with said base and projecting upwardly therefrom, the outer ones of said fingers being widened at the outer edges thereof adjacent said base to retain said fingers in the pockets of a pleater tape, a supporting arm projecting from base and extending upwardly behind said fingers, said supporting arm having a drape-hanging, hook-like formation at the free end thereof, a pinch clip having a deformable body and a pair of pleat retaining and locking arms integral with and projecting from said body, said pleat retaining arms being toed-in toward each other when said body is undeformed and being movable into substantially parallel position upon predetermined manual deformation of said body, and a pair of suspending arms integral with said base and said body for holding said pinch clip beneath said base and with said pleat retaining arms in substantial alignment with the spaces between respective outer pairs of said pleating fingers, said suspending arms being bendable to permit said pinch clip to be moved from a position beneath said base to a position behind said base and, upon said predetermined deformation of said body, to a position in which said pleat retaining arms project into said respective spaces, a portion of said pleat retaining arms projecting in front of said pleating fingers in said last mentioned position of said pinch clip, said pleat retaining arms, upon release of said body, toeing-in to lock said pinch clip in said last mentioned position thereof, said body having a tunnel formation extending rearwardly when said pinch clip is in said last mentioned position thereof, said tunnel formation accommodating said supporting arm in said last mentioned position of said pinch clip, said body having finger engageable portions on the outsides of said pleat retaining arms and a thumb engageable portion between said pleat retaining arms to permit deformation of said clip by manually engaging said body with two fingers on one face and the corresponding thumb on the other face.

References Cited by the Examiner
UNITED STATES PATENTS

| | | | |
|---|---|---|---|
| 2,623,583 | 12/52 | Handley | 160—348 |
| 2,690,861 | 10/54 | Tupper | 16—128 |
| 2,758,645 | 8/56 | Sherman | 160—348 |
| 2,796,928 | 6/57 | Bernhard et al. | 160—348 |
| 3,116,783 | 1/64 | Polkosnik | 160—348 |

CHARLES E. O'CONNELL, *Primary Examiner.*

HARRISON R. MOSELEY, *Examiner.*